US006995332B2

(12) United States Patent
Nagatsuka et al.

(10) Patent No.: US 6,995,332 B2
(45) Date of Patent: Feb. 7, 2006

(54) RESISTANCE WELDING METHOD AND STRUCTURE OF RESISTANCE WELDING PART, AND METHOD FOR MANUFACTURING ELECTRONIC COMPONENT AND ELECTRONIC COMPONENT

(75) Inventors: Eiichi Nagatsuka, Ebina (JP); Toshio Kitagawa, Takefu (JP); Akito Asakura, Fukui-ken (JP); Masaki Kitagawa, Fukui (JP); Akihiko Ueyama, Takefu (JP)

(73) Assignees: Murata Manufacturing Co., Ltd., Kyoto (JP); Fuji Xerox Co., Ltd., Tokyo (JP)

(*) Notice: Subject to any disclaimer, the term of this patent is extended or adjusted under 35 U.S.C. 154(b) by 114 days.

(21) Appl. No.: 10/712,034

(22) Filed: Nov. 14, 2003

(65) Prior Publication Data

US 2004/0094518 A1 May 20, 2004

Related U.S. Application Data

(62) Division of application No. 09/652,953, filed on Aug. 31, 2000, now Pat. No. 6,681,484.

(30) Foreign Application Priority Data

Sep. 2, 1999 (JP) ................................ 11-248164

(51) Int. Cl.
*B23K 11/16* (2006.01)
*B23K 9/00* (2006.01)

(52) U.S. Cl. .................. 219/118; 219/117.1; 219/78.01

(58) Field of Classification Search ................ 219/118, 219/117.1, 78.01
See application file for complete search history.

(56) References Cited

U.S. PATENT DOCUMENTS

| | | | | |
|---|---|---|---|---|
| 3,786,172 A | * | 1/1974 | Conley | 174/257 |
| 3,919,519 A | | 11/1975 | Petersen | |
| 4,772,823 A | * | 9/1988 | Matsuzaki et al. | 315/39.51 |
| 5,433,260 A | * | 7/1995 | Taylor | 164/97 |
| 5,532,910 A | * | 7/1996 | Suzuki et al. | 361/813 |
| 5,675,122 A | * | 10/1997 | Taylor | 174/50.58 |

FOREIGN PATENT DOCUMENTS

JP 57-23091 2/1982

(Continued)

*Primary Examiner*—M. Alexandra Elve
(74) *Attorney, Agent, or Firm*—Keating & Bennett, LLP

(57) ABSTRACT

The present invention provide a resistance welding method for solving the problem of breakage of the welded portion by corrosion of an iron-copper alloy layer having a poor corrosion resistance formed at the welding portion, when a first metallic member comprising an iron-based metal is joined to a second metallic member comprising a copper based metal, wherein the problem above is solved by forming a nickel film on at least one surface of the first metallic member comprising the iron-based metal and the second metallic member comprising the copper-based metal to be joined, and by applying resistance welding while the first metallic member is made to butt against the second metallic member, thereby forming the first alloy layer containing nickel, copper and iron at the side of the first metallic member, and the second alloy layer containing nickel and copper at the side of the second metallic member to allow the alloy layers to exhibit an excellent corrosion resistance.

4 Claims, 3 Drawing Sheets

FOREIGN PATENT DOCUMENTS

| | | |
|---|---|---|
| JP | 63-165835 | 10/1988 |
| JP | 2-256158 | 10/1990 |
| JP | 3-258467 | 11/1991 |
| JP | 4-89180 | 3/1992 |
| JP | 5-28751 | 7/1993 |
| JP | 7-3128 | 1/1995 |

* cited by examiner

RESISTANCE WELDING METHOD AND STRUCTURE OF RESISTANCE WELDING PART, AND METHOD FOR MANUFACTURING ELECTRONIC COMPONENT AND ELECTRONIC COMPONENT

This application is a Divisional of U.S. patent application Ser. No. 09/652,953 filed Aug. 31, 2000 now U.S. Pat. No. 6,681,484.

BACKGROUND OF THE INVENTION

1. Field of the Invention

The present invention relates to a resistance welding method and the structure of a resistance welding part obtained by the resistance welding method. Further, it pertains to a method for manufacturing an electronic component including the resistance welding method and the electronic component obtained by the method for manufacturing same.

2. Description of the Related Art

One may find the examples in which a process for joining a first metallic member comprising iron or an alloy containing iron (generically referred as an iron-based metal hereinafter) to a second metallic member comprising copper or an alloy containing copper (generically referred as a copper-based metal hereinafter) is applied in manufacturing an electronic component described, for example, in Japanese Examined Utility Model Publication No. 5-28751 or Japanese Unexamined Utility Model Publication No. 7-3128.

In more detail, the electronic component is provided with cap-shaped terminals put on its both ends and a central conductor placed on its center axis, and each cap-shaped terminal is electrically connected to the central conductor by applying resistance welding while the inner face of each cap-shaped terminal butts against each end face of the central conductor. The cap-shaped terminal serves as the first metallic member described above composed of the iron-based metal, and the central conductor serves as the second metallic member composed of the copper-based metal.

The iron-based metal and the copper-based metal have been selected as the materials of the cap-shaped terminal and the central conductor, respectively, by the following reasons.

In the electronic component having a specified structure as described in the foregoing utility model publications, the central conductor is electrically connected with an element by keeping elastic contact with an electrode formed on an inner face of a perforation hole of the element while the central conductor is received into the perforation hole provided in the element to be disposed around the central conductor. In addition, the element is mechanically positioned by the elastic contact. Accordingly, the central conductor is manufactured by rounding a metal plate comprising a copper-based metal such as phosphorus bronze and beryllium copper having a good electric conductivity and high elasticity into a cylinder.

The material of the cap-shaped terminal is required, on the other hand, to have a good resistance welding property with the central conductor described above as well as a relatively high mechanical strength. Therefore, an iron based metal such as an iron-nickel alloy is used for the material to have sufficient conductivity, oxidation resistance and corrosion resistance.

FIGS. 4A and 4B illustrate a method for joining the first-metallic member 1 comprising an iron-based metal to the second metallic member 2 comprising a copper-based metal by resistance welding.

As shown in FIG. 4A, the first metallic member 1 comprising an iron-based metal and the second metallic member 2 comprising a copper-based metal are at first prepared before applying resistance welding. A tin or silver film 3 is formed by plating on the surface of the first metallic member 1 in order to protect the iron-based metal comprising the first metallic member 1 from oxidation or corrosion, and in order to have a good solderability on the surface of the first metallic member 1.

Then, as shown in FIG. 4B, the first metallic member 1 is allowed to butt against the second metallic member 2, and an electric current is allowed to flow between the first metallic member 1 and the second metallic member 2 to form an alloy by fusing a part each of the first metallic member 1 and the second metallic member 2 by a heat generated by contact resistance between the first metallic member 1 and the second metallic member 2, thereby the first metallic member 1 is joined to the second metallic member 2.

After joining the two kind of the metallic members by resistance welding, an alloy layer 4 is formed along the interface between the first metallic member 1 and the second metallic member 2.

The tin or silver film 3 melts, or undergoes heat expansion or shrinkage, by the effect of the heat generated by welding. Accordingly, the tin or silver film 3 may be removed from the welded portion or cracks may be caused in the vicinity of the welded portion to expose the first metallic member in the vicinity of the welded portion.

However, since the alloy layer 4 formed by resistance welding as described above comprises an iron-copper alloy, it is readily corroded in an environment comprising corrosive substances such as water, halogens and acids. Consequently, corrosion of the alloy layer 4 progresses with time depending on the environment where the electronic component is used, when, for example, resistance welding is used for joining between the terminal member and the connecting conductor in the electronic component, sometimes resulting in shortening the service life of the electronic component.

When the surface of the first metallic member 1 is exposed from the tin or silver film 3 in the vicinity of the welded portion as hitherto described, it happens that iron contained in the first metallic member 1 corroded.

For preventing corrosion of the alloy layer 4, or the welded portion, from occurring, it may be contemplated to use the same material for the first metallic member 1 and the second metallic member 2. However, it is not too much to say that constructing the first metallic member 1 and the second metallic member 2 with the same material one another has no meaning so far as the iron-based metal is used for the first metallic member 1 and the copper-based metal is used for the second metallic member 2 as a measure for taking advantage of the characteristics of respective metals. Additionally, these metallic members 1 and 2 should not be particularly joined by welding but rather they may be constructed integrally, if the first and second members 1 and 2 may be made of the same material one another.

It may be also contemplated that a coating or plating treatment may be applied to form a protective film after welding in order to prevent corrosion of the alloy layer 4 and the first metallic member 1 exposed from the tin or silver film 3 from generating.

However, since the size of the welded portion is relatively small and other elements are disposed close in the vicinity of the welded portion when resistance welding is performed for bonding between the terminal member and the connecting conductor in electrical connection thereto in the electronic component, it is often very difficult to properly form the protective film on the welded portion and in the vicinity thereto.

SUMMARY OF THE INVENTION

Accordingly, the object of the present invention is to provide a resistance welding method and a structure of the resistance welding part that can prevent the problem of corrosion as hitherto described from occurring, and a method for manufacturing an electronic component and an electronic component manufactured by the method.

In one aspect for solving the technical problems described above, the present invention is directed toward a method for joining a first metallic member comprising iron or an alloy containing iron and a second metallic member comprising copper or an alloy containing copper with each other by resistance welding, comprising the steps of: forming a nickel film on at least one surface of the first and second metallic members; allowing the first metallic member to butt against the second metallic member via the nickel film; and allowing a part each of the first and second metallic members, and at least a part of the nickel film, to melt by flowing electric currents through the first and second metallic members to generate a heat based on contact resistance between the first and second metallic members, thereby joining the first metallic member to the second metallic member.

Preferably, the nickel film is formed by plating.

Preferably, the nickel film is formed with a thickness of 0.5 to 5.0 $\mu$m.

A tin or silver film may be additionally formed on the nickel film when the nickel film is formed on the surface of the first metallic member.

The resistance welding method according to the present invention may provide a structure of the resistance welding part, wherein a first alloy layer containing nickel, copper and iron is formed at the side of the first metallic member, and a second alloy layer containing nickel and copper is formed at the side of the second metallic member along the interfaces on the first metallic member and on the second metallic member, respectively.

Preferably, the first and second metallic members have a combined thickness of 5 to 10 $\mu$m.

In an another aspect, the present invention is directed toward a method for manufacturing an electronic component comprising the steps of: preparing a terminal member comprising iron or an alloy containing iron, and a connection conductor comprising copper or an alloy containing copper; and joining the terminal member and the connection conductor one another by resistance welding. The present invention directed toward the method for manufacturing the electronic component as described above is also provided with tile following construction.

The method for manufacturing the electronic component according to the present invention further comprises a step of forming a nickel film on a surface of at least one of the terminal member and the connection conductor, wherein the step for joining the terminal member and the connecting conductor one another by resistance welding further comprises the steps of: allowing the terminal member to butt against the connection conductor via the nickel film; and allowing a part each of the terminal member and the connection conductor, and at least a part of the nickel film to melt by flowing electric currents through the terminal member and the connection conductor while the former butts against the latter to generate a heat based on contact resistance between the terminal member and the connection conductor, thereby joining the terminal member to the connection conductor.

In an another aspect, the present invention is directed toward a method for manufacturing an electronic component having a specified structure as follows.

The method for manufacturing an electronic component comprises the steps of: preparing two cap-shaped terminals comprising iron or an alloy containing iron, a central conductor comprising copper or an alloy containing copper, and an element having a through hole for receiving the central conductor; forming a nickel film at least on the inner face of each cap-shaped terminal; disposing the element on the central conductor while the central conductor is received in the through hole; putting each cap-shaped terminal on each end of the element so that the inner face of each cap-shaped terminal is allowed to butt against each end face of the central conductor via the nickel film; and allowing a part each of the cap-shaped terminal and central conductor, and at least a part of the nickel film to melt by flowing electric currents through the cap-shaped terminal and the central conductor to generate a heat based on contact resistance between the cap-shaped terminal and the central conductor, thereby joining the cap-shaped terminal to the central conductor one another.

In an another aspect, the present invention is directed toward an electronic component provided with a terminal member comprising iron or an alloy containing iron, and a connection conductor comprising copper or an alloy containing copper, the terminal member being joined to the connection conductor by resistance welding.

In this electronic component, a first alloy layer containing nickel, copper and iron is formed at the side of the terminal member, and a second alloy layer containing nickel and copper is formed at the side of the connection conductor along the interfaces on terminal member and on the connection conductor, respectively.

In the electronic component as described above, the terminal member includes cap-shaped terminals to be put on both ends of the electronic component, and the connection member includes a central conductor to be disposed on the center line of the electronic component. The inner face of the cap-shaped terminal is joined to each end face of the central conductor by resistance welding in the portion where the former butts against the latter. The electronic component has an element having a through hole for receiving the central conductor and being disposed on the central conductor while the central conductor is received in the through hole.

DESCRIPTION OF THE PREFERRED EMBODIMENT

Figure 1A:
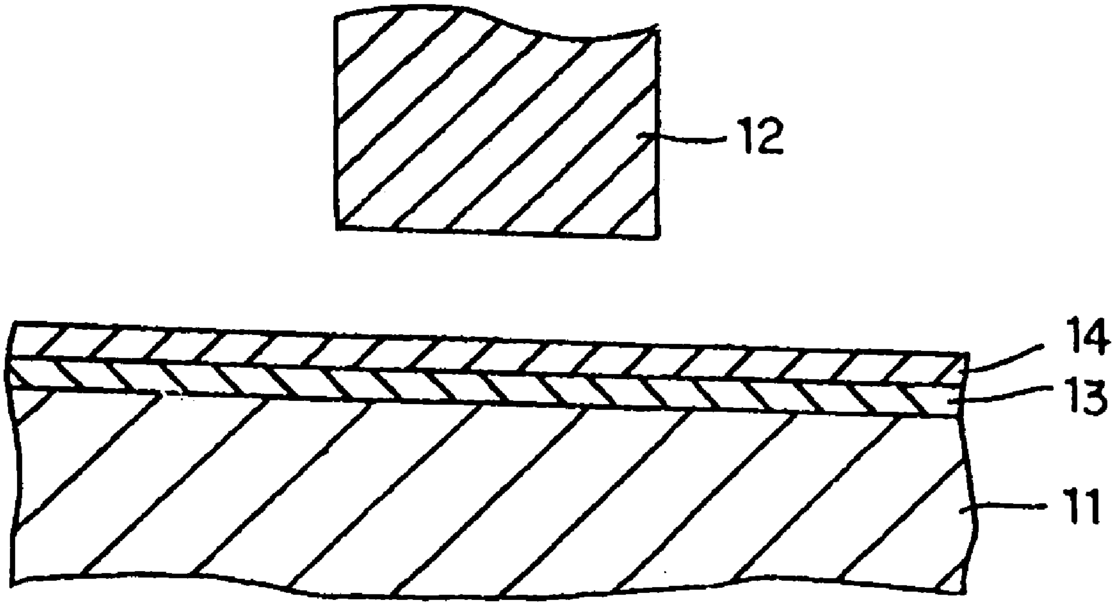
FIG. 1A is a cross sectional view schematically showing a resistance welding method according to an embodiment of the present invention.
Figure 1B:
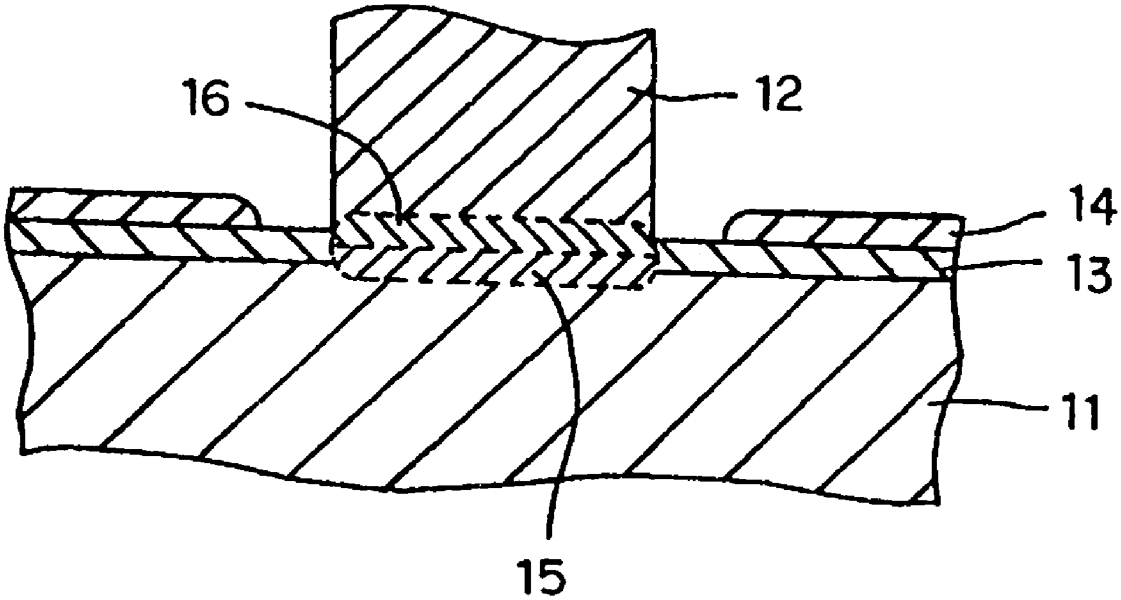
FIG. 1B is a cross sectional view schematically showing a resistance welding method according to an embodiment of the present invention.
Figure 4A:
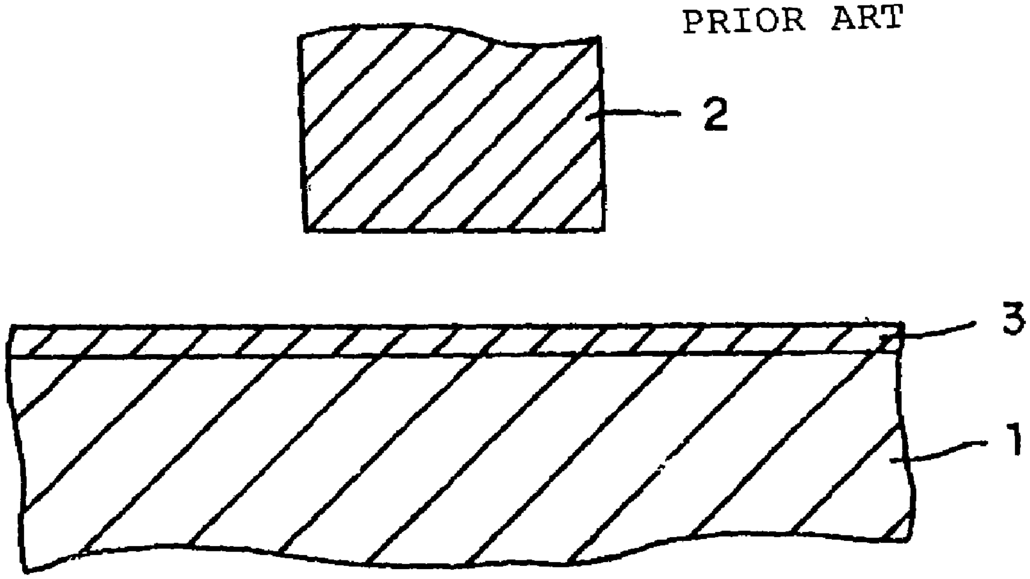
FIG. 4A PRIOR ART
FIG. 4A is a cross sectional view schematically showing the conventional resistance welding method.
Figure 4B:
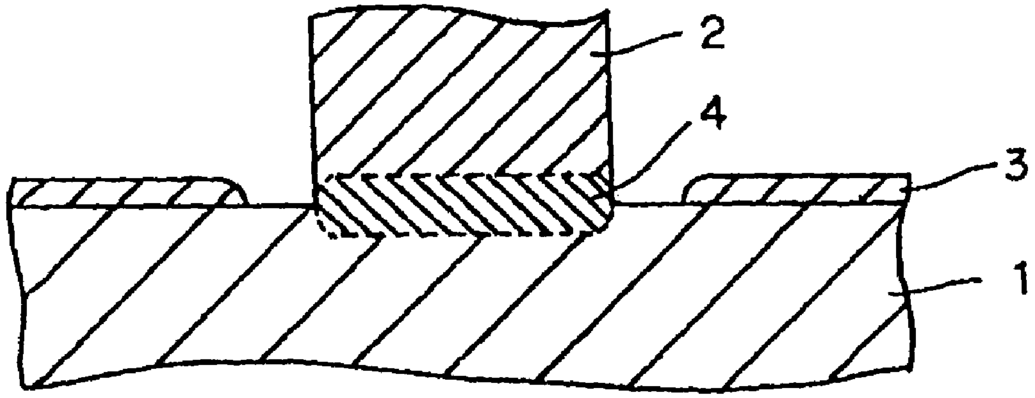
FIG. 4B PRIOR ART
FIG. 4B is a cross sectional view schematically showing the conventional resistance welding method.

FIGS. 1A and 1B correspond to FIGS. 4A and 4B for describing the resistance welding method according to one embodiment of the present invention. FIGS. 1A and 1B shows a method for joining a first metallic member 11 comprising an iron-based metal to a second metallic member 12 comprising a copper-based metal by resistance welding.

As shown in FIG. 1A, the first metallic member 11 and the second metallic member 12 are prepared. Then, a nickel film 13 is formed by, for example, plating on a surface of the first metallic member 11. The thickness of the nickel film 13 is preferably selected to be 0.5 to 5.0 μm, more preferably to be about 2 μm. Further, a tin or silver film 14 is formed on the nickel film 13 by, for example, plating.

Then, the first metallic member 11 abuts against the second metallic member 12. The nickel film 13 and the tin or silver film 14 are located between the first metallic member 11 and the second metallic member 12.

In the next step, electric currents are allowed to flow through the first and second metallic members 11 and 12. A part each of the first and second metallic members. 11 and 12, and at least a part of the nickel film 13 are melted by the heat generated by contact resistance between the first and second metallic members 11 and 12, thereby the first metallic member 11 is joined to the second metallic member 12.

After completing joining by resistance welding, a first alloy layer 15 containing nickel, copper and iron is formed at the side of the first metallic members 11, and a second alloy layer 16 containing nickel and copper is formed at the side of the second metallic member 12 along the interfaces on the first metallic members 11 and on the second metallic member 12, respectively. These first and second alloy layers 15 and 16 do not clearly form an interface between them, but actually the portion containing nickel and copper in which iron concentration increases relatively defines the first alloy layer 15, and the portion containing nickel and copper in which iron concentration is zero or decreases relatively defines the second alloy layer 16.

The resistance welding condition is preferably adjusted such that sum of the thickness of the first and second alloy layers 15 and 16 has a thickness of 5 to 10 μm.

Both of the first and second alloy layers 15 and 16 are not composed of an iron-copper alloy having a poor corrosion resistance, but are composed of an alloy containing nickel, copper and iron and an alloy containing nickel and copper, respectively. Therefore, they exhibit good corrosion resistance. The second alloy layer 16 composed of an alloy containing copper and nickel particularly exhibits superior corrosion resistance to the first alloy layer 15.

Therefore, the welded portion composed of the first alloy layer 15 and the second alloy layer 16 is hardly corroded when placed under a condition that corrosive substances such as water, halogens and acids are present. Therefore, the possibility of breaking the junction between the first metallic member 11 and the second metallic member 12 is greatly reduced.

The tin or silver film 14 in FIG. 1B is removed in the vicinity of the welded portion due to the heat generated by resistance welding, as in the case shown in FIG. 4B. However, the nickel film 13 still remains so as to cover the first metallic member 11, despite the tin or silver film 14 has been removed. Accordingly, the nickel film 13 defines a barrier or a protective film to prevent the first metallic member 11 from being corroded. The fact that the nickel film 13 remains to stably cover the first metallic member 11 after welding shows that the outer surfaces of the alloy layers 15 and 16 are not allowed to be exposed thereby to enhance the corrosion proof of the alloy layers 15 and 16.

The resistance welding method and the structure of the resistance welding portion as described above with reference to FIGS. 1A and 1B can be also advantageously applied to the resistance welding method and the structure of the resistance welding portion between the terminal member in the electronic component and the connection conductor to be connected to this terminal member.

The terminal member in this case corresponds to the first metallic member 11 comprising the iron-based metal, and the connection conductor-corresponds to the second metallic member 12 comprising the copper-based metal. The nickel film is formed on a surface of at least one of the terminal member and the connection member. When the terminal member is joined to the connection member by resistance welding, the terminal member butts against the connection conductor via the nickel film, electric currents are allowed to flow through the terminal member and the connection conductor to allow a part each of the terminal member and the connection member, and at least a part of the nickel film, to melt by the heat generated by contact resistance between the terminal member and the connection conductor, thereby joining the terminal member to the connection conductor.

In the electronic component obtained by applying resistance welding, the first alloy layer containing nickel, copper and iron is formed at the side of the terminal member, and the second alloy layer containing nickel, and copper is formed at the side of the connection conductor along the interfaces on the terminal member and on the connection conductor, respectively.

Figure 2:
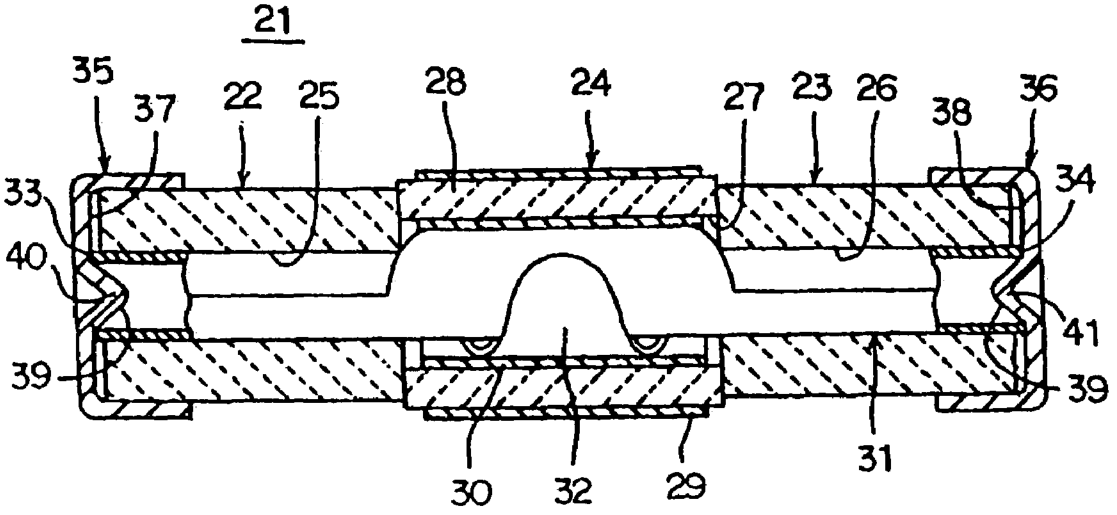
FIG. 2 is a cross sectional view showing the electronic component to which the resistance welding method shown in FIGS. 1A and 1B is advantageously applied.

The present invention can be also advantageously applied to the electronic component 21 having a specified structure as shown in FIG. 2. This electronic component 21 constitutes so called T type LC filter circuit, which comprises two inductor elements 22 and 23, and one capacitor element 24.

In more detail, the inductor elements 22 and 23 are composed of, for example, cylindrical ferrite beads. Through holes 25 and 26 extending along the axis line direction is provided in the inductor elements 22 and 23.

The capacitor element 24 is composed of, for example, a cylindrical capacitor such as a rectangular or cylindrical tube shape. The capacitor element 24 also comprises a cylindrical dielectric body 28 having a through hole 27 extending along the axis line direction, and an outer circumference electrode 29 and an inner circumference electrode 30 are formed on the outer circumference face and inner circumference face of the dielectric body 28, respectively.

A central conductor 31 as a connection conductor is arranged so as to perforate each through holes 25 to 27 of the inductor elements 22 and 23, and the capacitor element 24, respectively, such that the inductor elements 22 and 23, and the capacitor element 24 are aligned along the axis line direction and supported by the central conductor 31.

Figure 3:
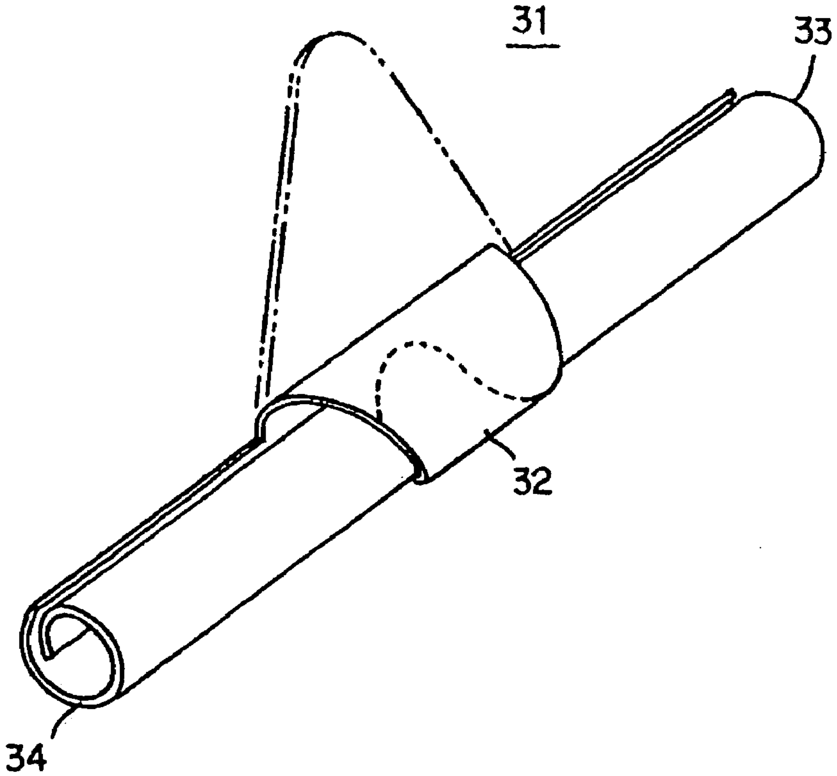
FIG. 3 is a perspective view showing a central conductor shown in FIG. 2.

FIG. 3 shows a perspective view of the central conductor 31.

The central conductor 31 is basically obtained by rounding, for example, a metal plate with a thickness of 0.05 to 0.08 mm. A copper-based metal having a high elasticity, for example phosphorus bronze and beryllium copper, is used for the metal plate. The metal plate constituting the central conductor 31 has an approximately T-shape in its extended state. Rounding of the T-shaped metal plate starts from the horizontally extended portion of the letter "T", and then the vertically extended portion is rounded thereon as shown by the imaginary line in FIG. 3. Accordingly, a resilient contact portion 32 having a relatively large diameter is formed at the center along the direction of length of the central conductor 31.

With reference to FIG. 2 again, the resilient contact portion 32 comes in elastic contact with the inner circumference electrode 30 of the capacitor element 24, when the central conductor 31 is disposed on the center line of the electronic component 21. Accordingly, electrical connection and mechanical fixing of the capacitor element 24 to the central conductor 31 can be secured without using any joining material such as a solder. Of course, the joining material such as a solder may be used together with this central conductor 31.

Since the central conductor 31 has a structure as shown in FIG. 3, a resilient force acting outwardly can be applied over the entire area along the longitudinal direction thereof. Accordingly, the inductor elements 22 and 23 can be also supported at a desired position on the central conductor 31.

Since the central conductor 31 is obtained by rounding a metal plate as described above, it assumes a cylindrical shape as a whole. Therefore, the end faces 33 and 34 of the central conductor 31 takes a ring shape having an opening at the center.

Cap-shaped terminals 35 and 36 to serve as terminal members are put on both ends of the electronic component 21, more specifically both ends of the inductor elements 22 and 23, respectively. An iron based metal such as iron or an iron-nickel alloy is used for the material of the cap-shaped terminals 35 and 36, and a nickel film 39 is formed on at least each inner face 37 and 38 of the cap-shaped terminals by, for example, plating. A nickel, tin or silver film (not shown) may be further formed on the surface of the cap-shaped terminals 35 and 36 by, for example, plating.

Projecting portions 40 and 41 are provided at the center of the inner faces 37 and 38 of each cap-shaped terminals 35 and 36. Providing such projecting portions 40 and 41 allows the central conductor 31 to be securely and properly centered to the cap-shaped terminals 35 and 36, by receiving the projecting portions 40 and 41 in the openings located at the center of the ring-shaped end faces 33 and 34.

The inner faces 37 and 38 of the cap-shaped terminals 35 and 36 butt against the end faces 33 and 34 of the central conductor 31 via the nickel film 39, when each element constituting the electronic component 21 has been assembled. Electric currents are allowed to flow through the cap-shaped terminals 35 and 36, and through the central conductor 31 to allow a part each of the cap-shaped terminals 35 and 36, and the central conductor 31 to melt, as well as at least a part of the nickel film 39 to melt by the heat produced by contact resistance between the cap-shaped terminals 35 and 36, and the central conductor 31, thereby joining the cap-shaped terminals 35 and 36 to the central conductor 31.

After completing joining by resistance welding, the first alloy layer containing nickel, copper and iron is formed at the side of the cap-shaped terminals 35 and 36, and the second alloy layer containing nickel and copper is formed at the side of the central conductor 31 along the interfaces (not shown) on the cap-shaped terminals 35 and 36, and on the side of the central conductor 31.

While the present invention has been described in relation to the illustrated embodiments, various other modifications are possible within the scope of the present invention.

For example, while the nickel film 13 or 39 has been formed at the side of the first metallic member 11 or cap-shaped terminals 35 and 36, the nickel film may be formed at the side of the second metallic member 12 or central conductor 31.

According to the resistance welding method of the present invention, resistance welding is applied while the first metallic member butt against the second metallic member via the nickel film by forming in advance the nickel film on a surface at least one of the first and second metallic members, when the first metallic member comprising the iron-based metal is joined to the second metallic member comprising the copper-based metal by resistance welding. Consequently, a part each of the first and second metallic members, and at least a part of the nickel film are melt by the heat generated by contact resistance, thereby the first metallic member is joined to the second metallic member.

Accordingly, an iron-copper alloy having poor corrosion i resistance is hardly formed along the interfaces on the first metallic member and on the second metallic member at the resistance welding part obtained. The first alloy layer containing nickel, copper and iron is formed at the side of the first metallic member, and the second alloy layer containing nickel and copper is formed at the side of the second metallic member. Since the first and second alloy layers, particularly the second alloy layer, show an excellent corrosion resistance, corrosion of the welded part can be advantageously prevented. Therefor, the first metallic member and the second metallic member can be joined with high reliability, even when the resistance welding part is placed under an environment where corrosive substances are present.

A nickel film having, for example, a thickness of 0.5 to 5.0 $\mu$m can be efficiently formed by forming the nickel film by plating as described above.

When the nickel film is formed with a thickness of 0.5 $\mu$m or more as described above, the first and second alloy layers containing nickel may be more securely formed, while desired resistance welding may be more easily applied by forming the nickel film with a thickness of 5.0 $\mu$m or less.

When a structure in which the surface of the first metallic member is covered with a tin or silver film is to be obtained, resistance welding according to the present invention is applied while a nickel film is at first formed on the surface of the first metallic member and a tin or silver film is further formed on the nickel film. Then, since the surface of the first metallic member and/or the surface of the alloy layer remains to be covered with the nickel film, even when a part of the tin or silver film has been eliminated as a result of resistance welding, iron and/or the alloy layer contained in the first metallic member is prevented from corroding.

In the structure of the resistance welding part according to the present invention, when the combined thickness of the first and second alloy layers is adjusted to be 5 to 10 $\mu$m, reliability with respect to corrosion resistance can be more secured.

The present invention is directed toward the method for manufacturing the electronic component provided with the terminal member and connection conductor to be connected thereto by applying resistance welding for joining the terminal member to the connection conductor. Consequently, reliability of the joining between the terminal member and the connection conductor can be enhanced to extend the service life of the electronic component regardless of the environment under which the electronic component is used.

The effect as described above is made to be more evident when the present invention is directed toward the electronic component comprising the cap member including the cap-shaped terminals to be put on the both ends of the electronic component and the connection conductor including the central conductor disposed on the center line of the electronic component, wherein the inner face of the cap-shaped terminal is joined to each end face of the central conductor by resistance welding while the former butts against the latter, and wherein the electronic component further comprises an element having a through hole for receiving the central conductor and being disposed on the central conductor while the central conductor is received in the through hole. The reason is that the joint portion between the inner face of the cap-shaped terminal and the central conductor is located within the electronic component, thus appropriately forming a protective film for preventing corrosion is impossible.

What is claimed is:

1. A structure of a resistance welded part comprising:

a first metallic member comprising iron or an alloy containing iron;

a second metallic member comprising copper or an alloy containing copper;

the first and second metallic members being joined together by:

1) forming a nickel film on at least one surface of the first and second metallic members;

2) allowing the first metallic member to butt against the second metallic member via the nickel film; and 3) melting a part of each of the first and second metallic members and at least a part of the nickel film by flowing electric currents through the first and second metallic members to generate heat based on contact resistance between the first and second metallic members, thereby joining the first metallic member to the second metallic member so that a first alloy layer containing nickel, copper and iron is formed adjacent the first metallic member at the interface between the first and second metallic members and a second alloy layer containing nickel and cooper is formed adjacent the second metallic member at the interface between the first and second metallic members; wherein the nickel film is formed by plating; and the nickel film is formed with a thickness of about 0.5 μm to about 5.0 μm.

2. A structure of a resistance welded part comprising:

a first metallic member comprising iron or an alloy containing iron;

a second metallic member comprising copper or an alloy containing copper;

the first and second metallic members being joined together by:

1) forming a nickel film on at least one surface of the first and second metallic members;

2) allowing the first metallic member to butt against the second metallic member via the nickel film; and 3) melting a part of each of the first and second metallic members and at least a part of the nickel film by flowing electric currents through the first and second metallic members to generate heat based on contact resistance between the first and second metallic members, thereby joining the first metallic member to the second metallic member so that a first alloy layer containing nickel, copper and iron is formed adjacent the first metallic member at the interface between the first and second metallic members and a second alloy layer containing nickel and copper is formed adjacent the second metallic member at the interface between the first and second metallic members; wherein the nickel film is formed with a thickness of about 0.5 μm to about 5.0 μm.

3. A structure of a resistance welded part according to claim 1, wherein the nickel film is formed on the surface of the first metallic member and wherein a tin or silver film is formed on the nickel film before the welding operation.

4. A structure of a resistance welded part according to claim 2, wherein the nickel film is formed on the surface of the first metallic member and wherein a tin or silver film is formed on the nickel film before the welding operation.

* * * * *